(12) United States Patent
Freeman, Jr.

(10) Patent No.: US 10,899,475 B1
(45) Date of Patent: Jan. 26, 2021

(54) TRANSMISSION LINE TETHERED DRONE SYSTEM

(71) Applicant: Mark Freeman, Jr., Alma, AR (US)

(72) Inventor: Mark Freeman, Jr., Alma, AR (US)

( * ) Notice: Subject to any disclaimer, the term of this patent is extended or adjusted under 35 U.S.C. 154(b) by 251 days.

(21) Appl. No.: 16/033,982

(22) Filed: Jul. 12, 2018

Related U.S. Application Data (60) Provisional application No. 62/534,276, filed on Jul. 19, 2017.

(51) Int. Cl.
*B64F 3/02* (2006.01)
*B64C 39/02* (2006.01)

(52) U.S. Cl.
CPC .............. *B64F 3/02* (2013.01); *B64C 39/022* (2013.01); *B64C 39/024* (2013.01); *B64C 2201/042* (2013.01); *B64C 2201/148* (2013.01)

(58) Field of Classification Search
CPC ....... B64F 3/02; B64C 39/022; B64C 39/024; B64C 2201/042; B64C 2201/148
USPC .......................................................... 244/60
See application file for complete search history.

(56) References Cited

U.S. PATENT DOCUMENTS

| | | | | |
|---|---|---|---|---|
| 1,733,270 A | * | 10/1929 | Messer | B61B 15/00 191/12 R |
| 2,462,201 A | * | 2/1949 | Kilgore | B64D 27/24 244/60 |
| 3,715,991 A | * | 2/1973 | Boyd | B64F 3/02 104/23.1 |
| 4,036,147 A | * | 7/1977 | Westling | B61B 15/00 104/23.1 |
| 7,318,564 B1 | * | 1/2008 | Marshall | B60L 53/11 244/58 |
| 7,931,239 B2 | | 4/2011 | Pedersen et al. | 244/189 |
| 9,073,532 B2 | | 7/2015 | Pedersen et al. | 702/150 |
| 9,645,580 B2 | | 5/2017 | Pedersen et al. | |
| 9,904,292 B2 | | 2/2018 | Pedersen et al. | |
| 2017/0015414 A1 | * | 1/2017 | Chan | H02G 1/02 |

* cited by examiner

*Primary Examiner* — Richard R. Green
*Assistant Examiner* — Brady W Frazier
(74) *Attorney, Agent, or Firm* — Keisling & Pieper PLC; David B. Pieper; Trent C. Keisling (57) ABSTRACT

An unmanned aircraft system 100 built off of a purpose-built transmission infrastructure 300 with a power collector 400 riding along the infrastructure 300 connected to a tether 500 that is electrically connected to both the infrastructure 300 through the power collector 400 and also connected to an unmanned aircraft carrying associated electronics that are powered through the tether.

6 Claims, 7 Drawing Sheets

TRANSMISSION LINE TETHERED DRONE SYSTEM

CROSS-REFERENCE TO RELATED APPLICATIONS

This application claims priority to and is a continuation-in-part of U.S. Provisional Application Ser. No. 62/534,276 filed on Jul. 19, 2017. Each of these prior applications is incorporated by reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in unmanned flying drones. More particularly, the invention relates to improvements particularly suited for enhanced data collection times and package delivery purposes. In particular, the present invention relates specifically to a drone tethered to an electrical transmission wire system for continuous or extended periods of operation.

2. Description of the Known Art

As will be appreciated by those skilled in the art, drones are known in various forms. Patents disclosing information relevant to drones include: U.S. Pat. No. 9,904,292, issued to Pedersen, et al. on Feb. 27, 2018 entitled Method for operating a radio-controlled flying hovercraft; U.S. Pat. No. 9,645,580, issued to Pedersen, et al. on May 9, 2017 entitled Radio-controlled flying craft; U.S. Pat. No. 9,073,532, issued to Pedersen, et al. on Jul. 7, 2015 entitled Homeostatic flying hovercraft; and U.S. Pat. No. 7,931,239, issued to Pedersen, et al. on Apr. 26, 2011 entitled Homeostatic flying hovercraft. Each of these patents is hereby expressly incorporated by reference in their entirety.

The United States border is nearly 2,000 miles in length and will require security forever. The border patrol has the daunting task of securing thousands of miles of border. Combined with limited capability, including sensors, for such a large expanse, millions of illegal border crossings have occurred over the decades. Advances in sensor technology has made them smaller, cheaper and more powerful; however, unmanned aircraft system (UAS) sensor platforms and usability are lagging behind. After interviewing a NASA researcher and personnel deployed to utilize sensors on the border, we became convinced that any open ground or barrier constructed will require sensor surveillance and that the lack of persistence, as well as sensor placement, will never be adequately addressed with the current technology. The porous nature of the border issue is what ultimately needs to be addressed. Preventing illegal border crossings and damage to barriers will not be accomplished without detection. Agents will need surveillance capability that allows them to detect, track, and detain or prevent damage to structures. Operations must continue day or night, seven days a week, in all weather conditions.

Unmanned aircraft systems have been eyed as one of the tools law enforcement can use and have used in securing the border; however, the costs of some of these programs, such as the Predator B at over $12,000 per flight hour, are exorbitant and difficult to utilize by agents. Small UAVs, such as multi-rotors with sensors, must be deployed and recovered, distracting from the agent's task; they also have very limited range and flight time.

From these prior references it may be seen that these prior art patents are very limited in their teaching and utilization, and an improved electrical transmission line tethered drone is needed to overcome these limitations.

SUMMARY OF THE INVENTION

The present invention is directed to an improved tethered drone using a coupling to an elongated power transmission system.

One advantage of the present invention is a drone with long endurance that can travel a long distance via coupling to a power transmission system.

Another advantage of the present invention is an electrical power transmission system consisting of two conductor and guidance wires mounted on a transmission infrastructure and associated hardware that allow passage of a suspended power collector that transfers electrical energy to the drone and powers the aircraft and sensors.

Another advantage of the present invention is an interactive sensor platform for border patrol agents.

Another advantage of the present invention is the ability to place sensors, in minutes, across the entirety of the southern border. In addition, agents interact with those sensors and keep that sensor capability there indefinitely, especially when monitoring hot spots.

The present invention provides a movable sensor platform that agents and the agency can interact with and operate continuously 24 hours a day.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

As shown in Figured 1 through 7 of the drawings, one exemplary embodiment of the present invention is generally shown as a power line tethered unmanned aircraft system 100. The present unmanned aircraft system 100, UAS 100, technology proposition is radical. It has never existed before in our proposed form but relies on proven and extremely reliable technology of an electrical transmission infrastructure 300. Energy transmission systems are the mainstay of modern society. Homes, businesses, railways and cities run so effortlessly from powerlines that they are rarely thought of. The present system uses an unmanned aircraft system 200 (UAS 200). Our design does not require a UAS 200 to rely on batteries, fuel or an aircraft to carry pilots and is scalable. This concept is powered by an electrical transmission infrastructure 300 that feeds power to the UAV 200 components, which transverse wires 305 and has the added benefit of safe separation, being tethered, from aircraft operating in the National Airspace System. It operates 24 hours a day all year long.

The unmanned aircraft system 100 consists of purpose-built transmission infrastructure 300; a power collector 400 riding along the infrastructure 300; a tether 500 electrically connected to the infrastructure 300 through the power collector 400; and an unmanned aircraft 200 carrying associated electronics 600 powered by power received through the tether 500.

Unmanned aircraft 200 using propeller blades 210 operated by a motor 220 mounted to a housing 230 for carrying payloads 240 including FMV (Full Motion Video), Change Detection, IR sensors, communication systems, and radar. The UAV is an electric conversion of the battle field proven T-HAWK MAV from Avid LLC, 322 Freedom Blvd Ste C, Yorktown, Va. 23692 that has a successful track record (nominally <20 lbs/<42"). With unique hover-and-stare capability, T-HAWK supports advanced intelligence, surveillance and reconnaissance (ISR) with real-time video documentation. Combat-proven since 2007, the T-HAWK features vertical takeoff and landing (VTOL). Carrying a variety of payloads, T-HAWK can be configured to support a broad range of missions. The ducted fan has the advantage of lifting considerably more payload for its size, and can be quieter, safer, higher performance, and more compact than open rotor vehicles.

Purpose-built transmission infrastructure 300, using multiple wires 305 forming a line 307, including a top wire 310 and bottom wire 320 in the preferred embodiment, supported off of poles 330 via multiple wire stand off hardware 350 for support, tensioning, and guidance of conductors 310, 320 (wires) that are specially arranged to facilitate the movement of the power collector 400 along the transmission infrastructure 300, and substations and switching stations to allow an infrastructure or line change along with a power supply or generator. The powerline infrastructure is either permanent or temporary and transportable. Our novel approach will provide the capability requested by either constructing several different types of infrastructure depending on the desired nature. One system uses an open transmission infrastructure which would require little ground and no interfere with surface activity that could be permanent or temporary. Another example would be a transmission infrastructure behind a concrete wall or walls.

Figure 1:
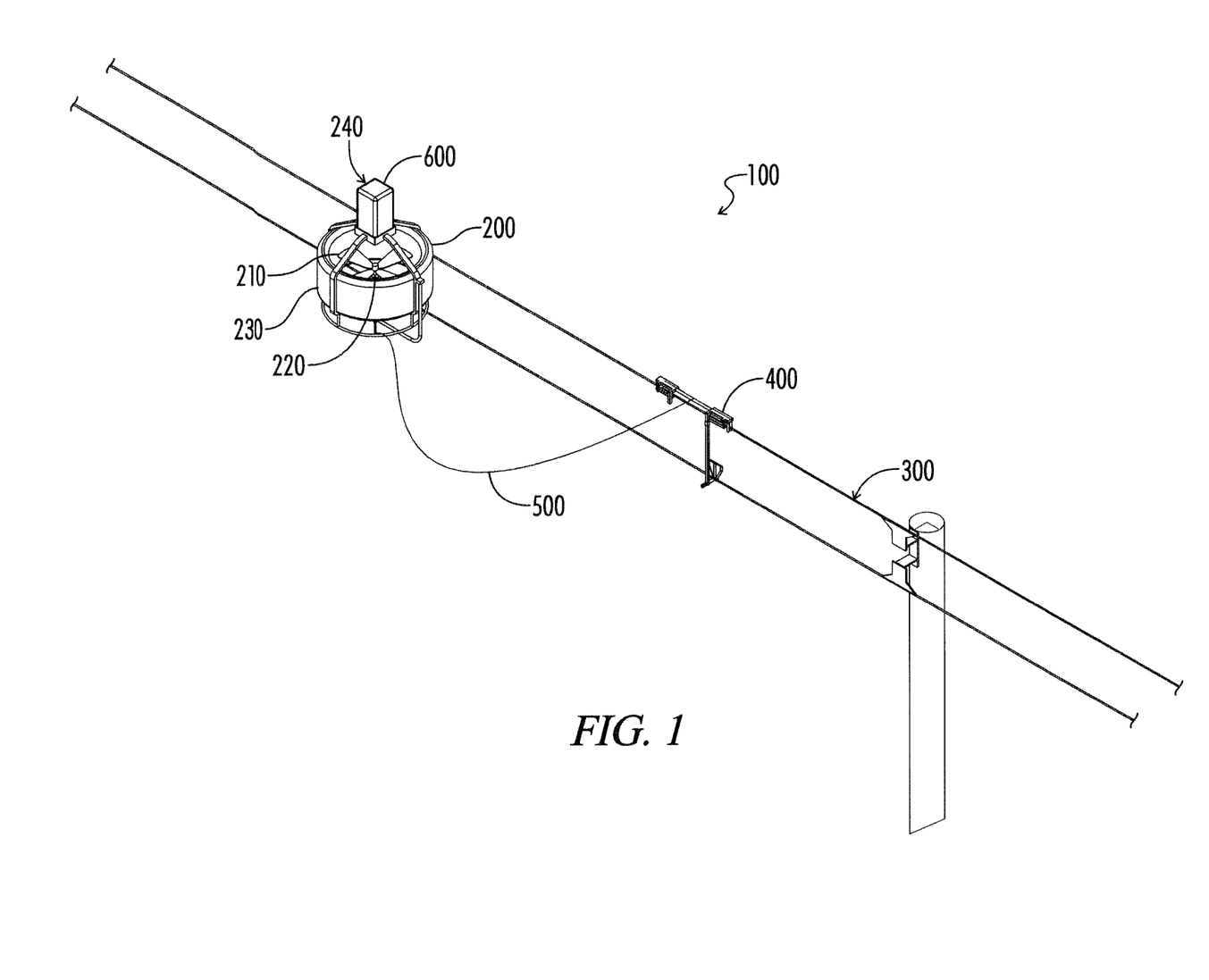
FIG. 1 is a perspective view of an unmanned aircraft system operationally powered and moveable along an electrical transmission infrastructure.
Figure 2:
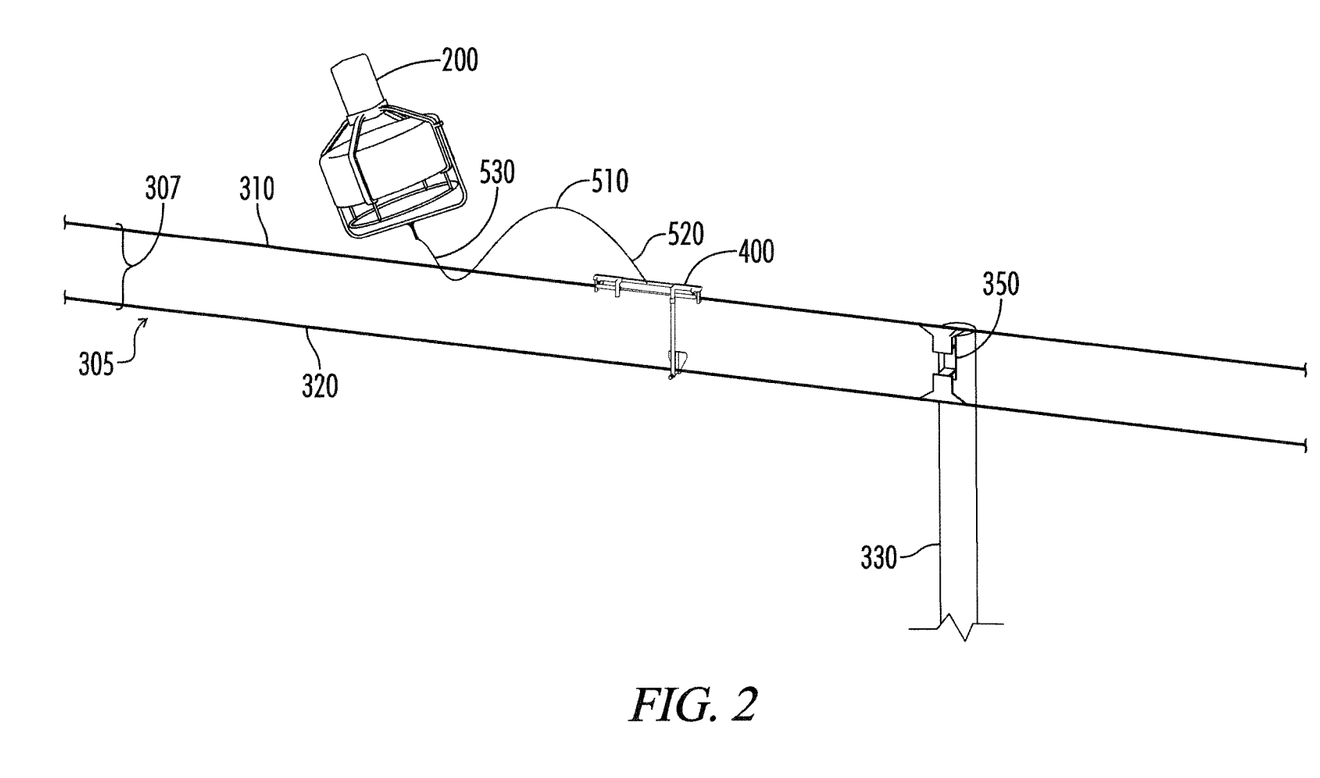
FIG. 2 is another perspective view thereof.
Figure 3:
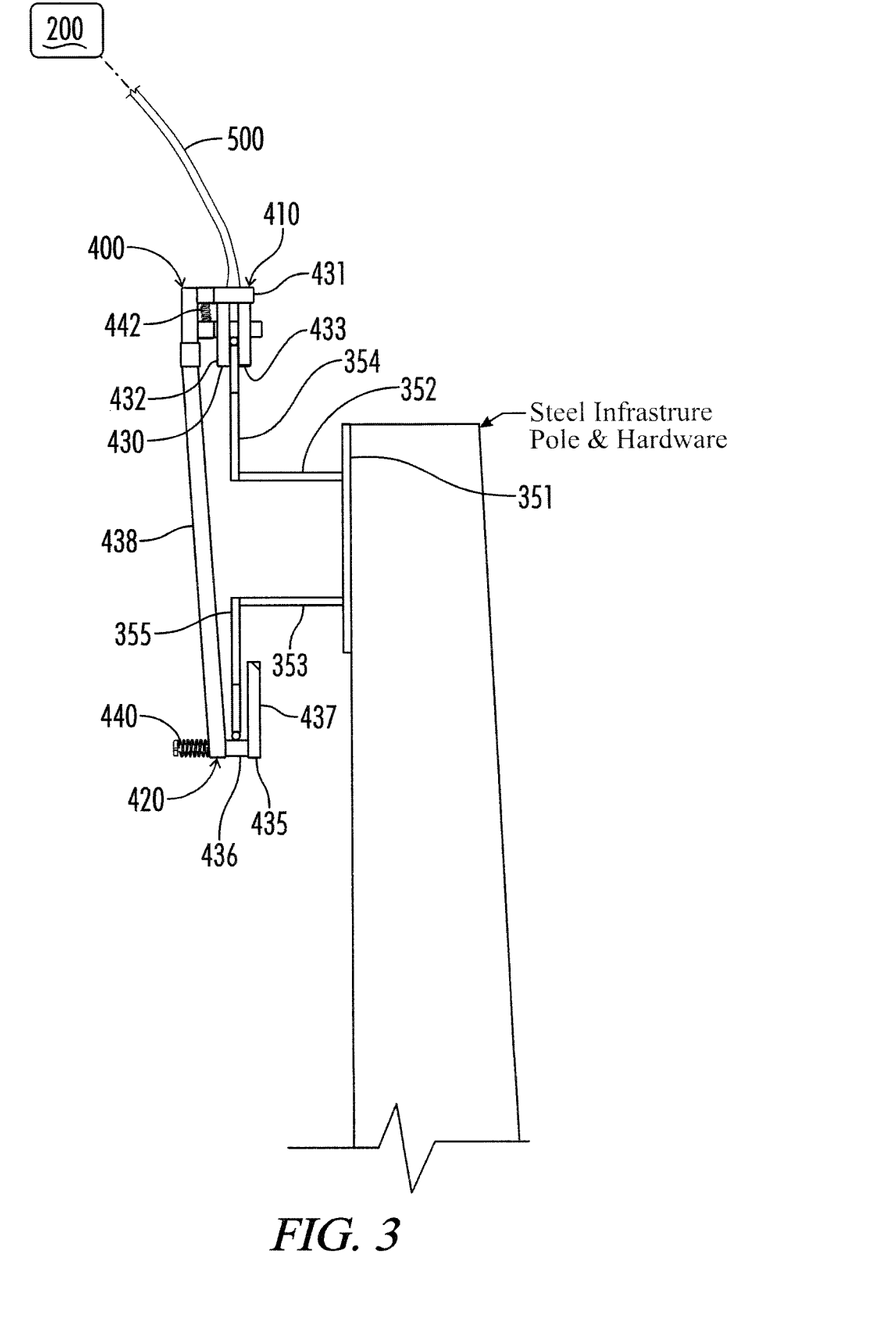
FIG. 3 is a schematic view of the power collection, line hardware, tether, and supporting pole.

In one embodiment shown in FIGS. 1, 2, and 3, the multiple wire stand off hardware 350 uses a base 351 with a top extending arm 352 and bottom extending arm 353. A planar upward extending hand 354 is supported off of the top extending arm 352 and a planar downward extending hand 355 is supported off of the bottom extending arm 353. The top wire 310 is secured to the to the upward extending hand 354 and the bottom wire 320 is secured to the downward extending hand 355.

Figure 4:
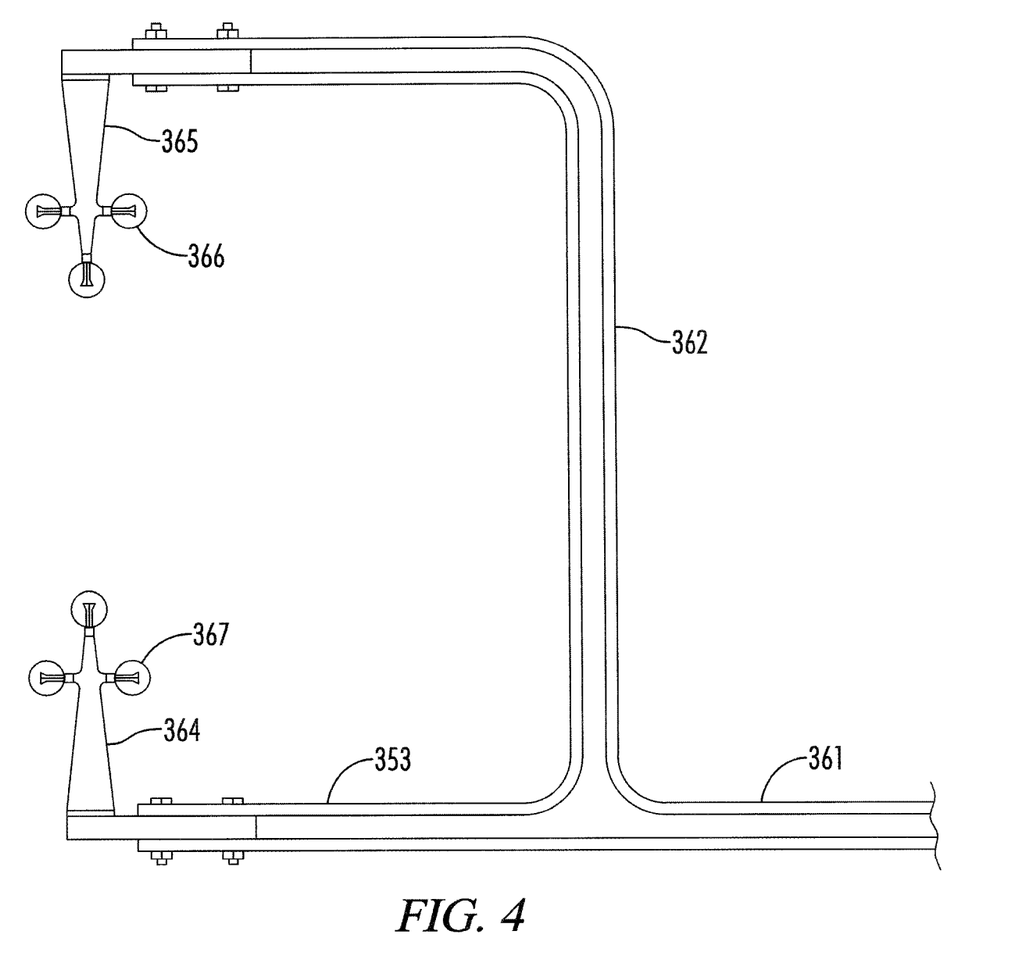
FIG. 4 is a schematic of line hardware using finger supports for the conductors.
Figure 5:
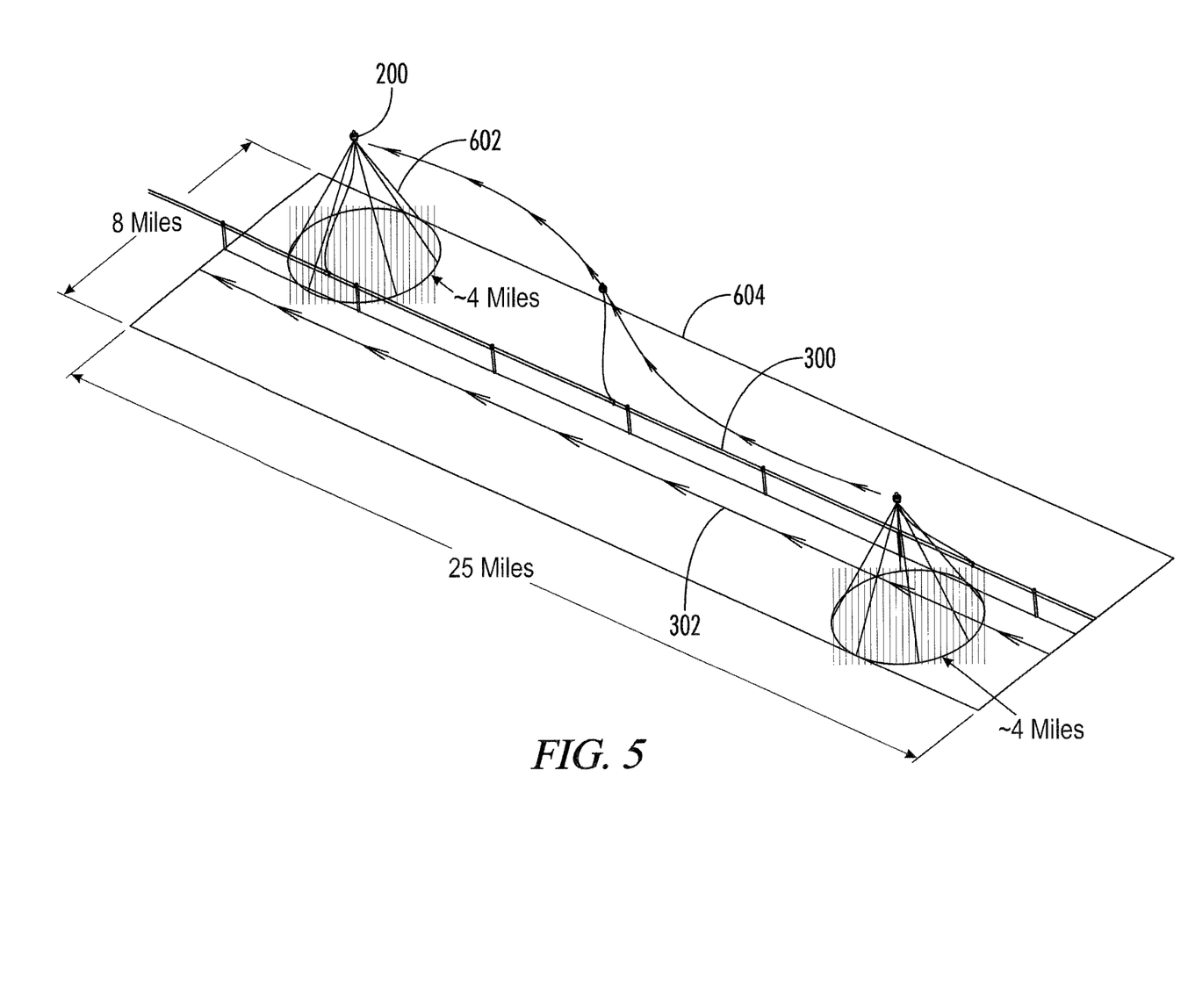
FIG. 5 is a schematic of sensor range and coverage along a transmission line.
Figure 7:
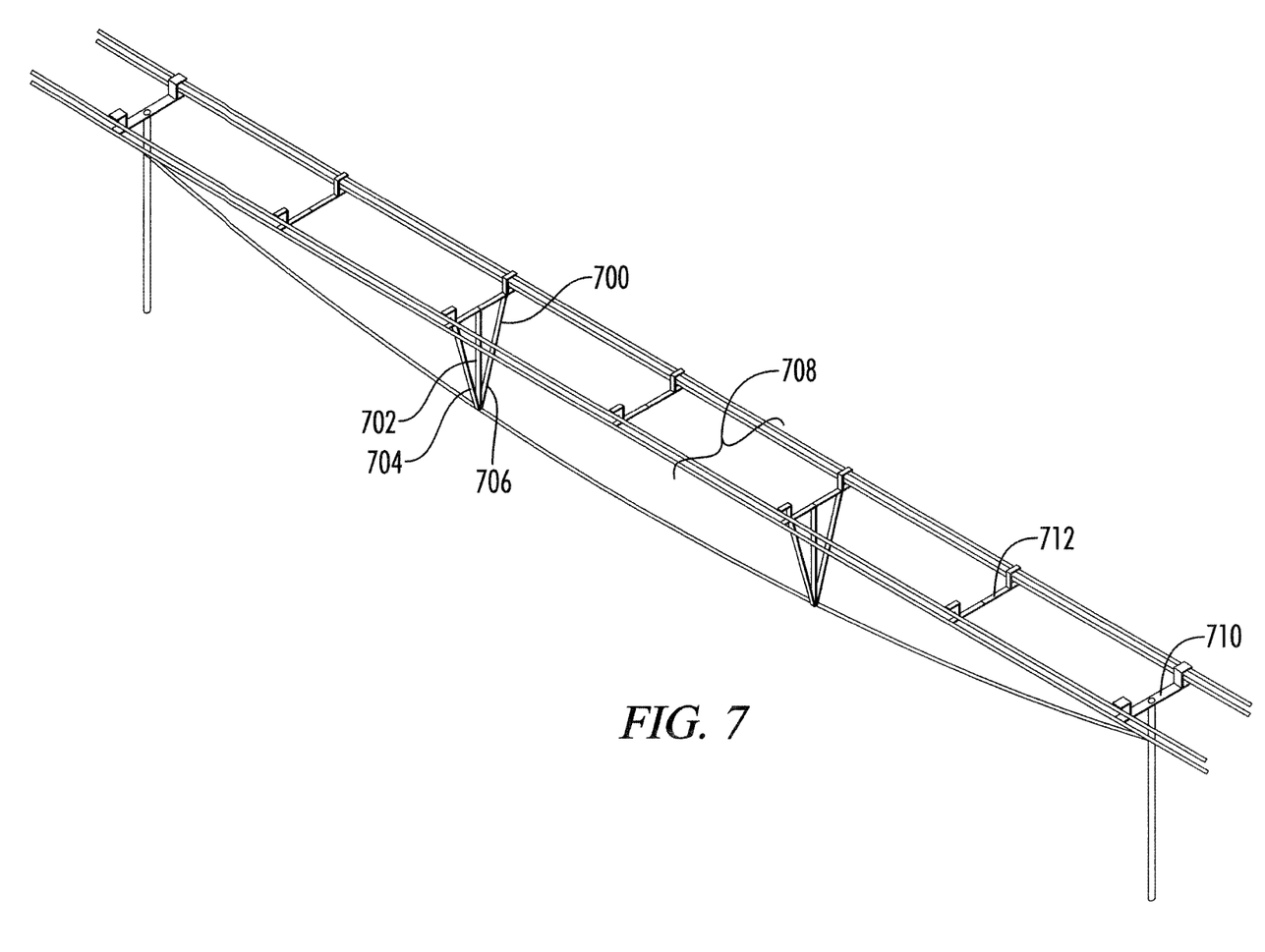
FIG. 7 is a schematic of a horizontal line support off of a drooping line system.

In another one embodiment shown in FIGS. 4 and 7, the multiple wire stand off hardware 350 uses a base 361 with a top extending bent arm 362 and bottom extending straight arm 363. A planar downward extending hand 365 is supported off of the top extending arm 362 and a planar upward extending hand 364 is supported off of the bottom extending straight aim 363. The top wire 310 is secured to upper fingers 366 supported by the downward extending hand 365 and the bottom wire 320 is secured to lower fingers 367 supported by the upward extending hand 364. In the embodiment shown in FIG. 7, drooping line supports 700 comprised of a vertical support 702, first angled stabilizer 704, and second angled stabilizer 706 can be used to support opposing side line sets 708. The line 307 positioning and conductor separation can be maintained by using opposing line pole support brackets 710 and opposing line pole unsupported brackets 712.

A power collector 400 transitions the infrastructure 300. The power collector 400 includes a first upper line trolley 410 structurally connected to but electrically isolated from a second lower line arm 420. The upper line trolley 410 uses a top tensioning spring 442 to bias tension rollers 430 including a top tension roller 431, first side tension roller 432, and second side tension roller 433 to ride along the top wire 310 and electrically connect the tether 500 to the top conductor 310. The lower line arm 420 uses a capturing cradle 435 including a bottom tensioning spring 440 biasing a bottom tension roller 436 and a side tension roller 437 and a power collector 438 to ride along the bottom wire 320 and electrically connect the bottom conductor 320 to another wire in the tether 500.

A tether 500 including a multiwire power conductor line 510 extending from a collector end 520 to a vehicle end 530 to transmit power from the multiple s wires 305 to power the UAV 100.

Figure 6:
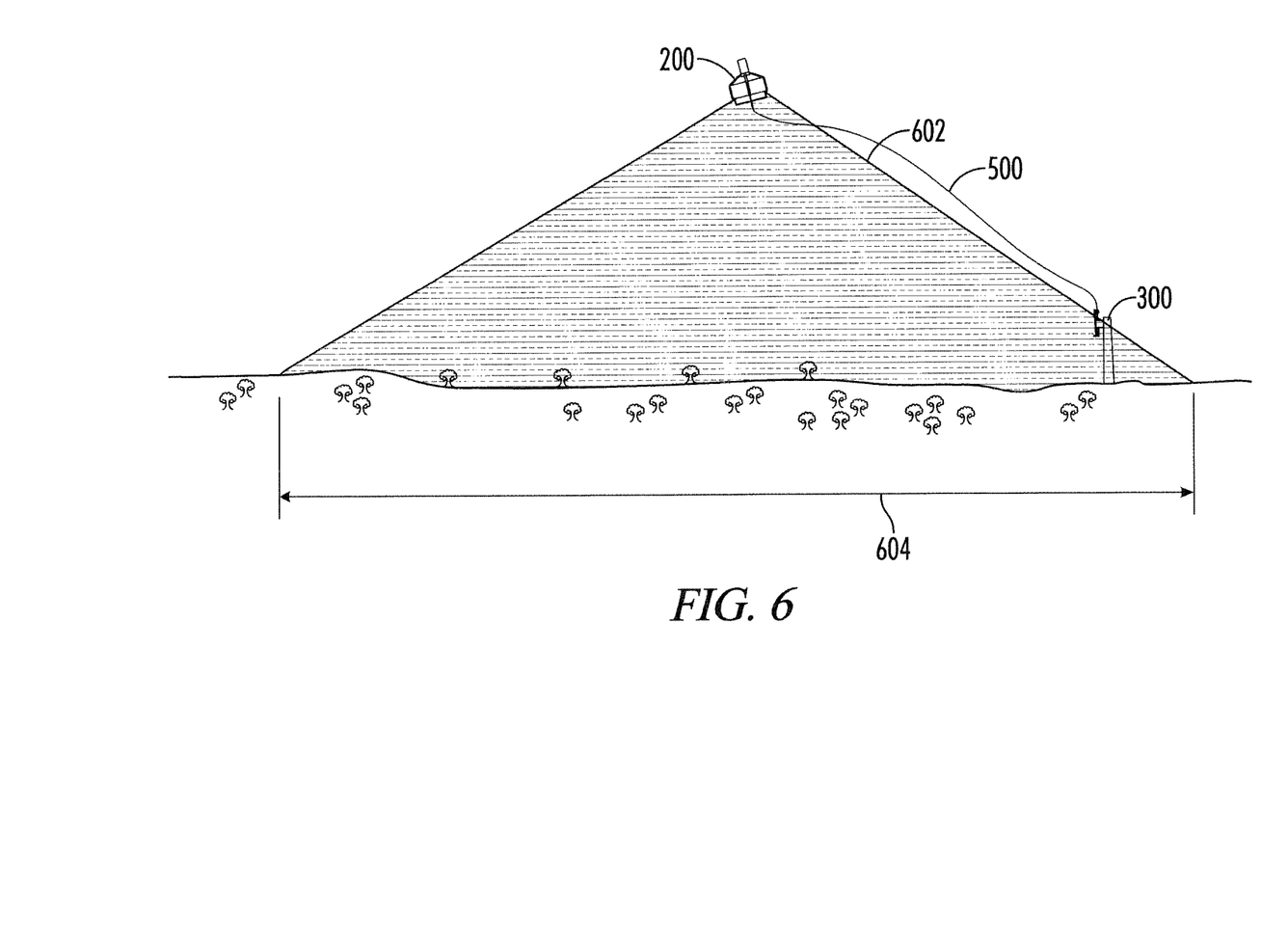
FIG. 6 is a schematic of sensor coverage.

Associated electronics 600 for communication and navigation allowing autonomous operation or interaction with users such as the previous noted FMV (Full Motion Video), Change Detection, IR sensors, communication systems, and radar. As noted by FIG. 5, the altitude of the unmanned aircraft 200 provides an extended sensor cone 602 that covers a power line parallel sensor area 604 on each side of the transmission line 300. FIG. 6 shows how the sensor cone 602 can extend for a 4 mile sensor range 604 parallel to the transmission line 300 covering an eight mile width expanse along the power line 300 length shown here as approximately 25 miles at this scale that centered on the power line 300. Note that the length is dependent only on the length of the power line 300.

How it works.

The electrical infrastructure 300 is erected in the desired path 302 where sensors are needed adjacent to barriers, open ground, or cities. Component systems are installed and the line 307 is energized. A UAV 100 is launched from a takeoff and landing area. As the aircraft 100 rises, tension is put on its tether 500 which is powered from the power line 307. The power collector 400 is caged to, and powers the tether 500 from the lines, and is movable along them. As the UAV 100 proceeds in the guided direction along the transmission infrastructure 300, the tether 500 pulls the power collector 400, caged by tension rollers 430, along wires 305 and allows the powered UAV 100 to fly forward, backward, and side to side in relationship to where the transmission infrastructure 300 exists.

The system 100 has the capability for multiple UAVs 100 to operate on one or multiple conductors 305 tracks for hundreds or thousands of miles. Additionally, designed features allow switching stations in which UAVs 100 can change to another line 307 or switch tracks when necessary, for example, to depart to another area where another transmission line infrastructure is located, or pass other UAVs on another wire track, or maintenance.

Depending on power requirements the tether could be hundreds or thousands of feet in length. In addition, a motor-powered power collector 400 could allow the UAV to move in a perpendicular fashion essentially flying sideways to the transmission infrastructure for maximum extension allowing expanded sensor effectiveness.

The transmission line 307 has the capability to act as an uplink or downlink or provide communications for the entire system 100. Fiber-optic cables could also be installed to relay information in addition to providing visuals to and allow control by agents For border protection multiple UAVs 100 could be used along a border transmission line 307 along the terrain of the border. This, essentially UAV 100 "sensor" wall, if broken down into 25-mile sections each, for example, allow for 80 UAV's to be arrayed, patrolling, interacting, or any combination desired, to place sensor coverage anywhere on the entire border quickly, excluding severe weather conditions, operate 24 hours a day without the need to land, excluding scheduled or unscheduled maintenance or overhaul.

The possibility to operate autonomously and continuously, alerting agents by the change detection in the search area that the UAV 100 has been assigned so quickly would be unprecedented, and provide very economical rapid identification. The ability of multiple UAV's 100 to transverse the transmission infrastructure would decrease the surveillance time to cover every square mile of the southern border unlike any current system. The cost would be between $50 to $300 per flight compared to $12,000 an hour for the Predator B and a minimum of $2000 per flight-hour-manned aircraft.

Although the initial cost and challenge to build would be great, the amortized cost in the long run would be offset. This design gives the Border Patrol tremendous advantage over other systems due to the fact it operates continuously. Pilots "time out" or fatigue, aerostats, towers, and single location tethered drones can't move to look closer at a target. Current UAS's cannot stay up indefinitely, which is so important for hot spots. Once in place, our system would provide superior performance to the aforementioned due to the fact that it never lands. Wear and tear is relatively low. Electrical Transmission systems do not occupy any material quantity of ground, and the intervening land between posts could be left for cultivation, other use, or its natural state. A system could be constructed and worked on hilly ground at a cost not greatly exceeding that which would be called for on-level country. Thus, this system can be built straight through nature without harming animal and plant life. The present invention's novel approach to providing a sensor platform that flies 24 hours a day, never lands and can be interacted with; will give agents in the border patrol an advantage over any other system available today.

In recent years, the availability of inexpensive and very capable small unmanned air systems for military perimeters has proliferated around the world. These devices have been equipped with explosives and used, with much success, in combat. The ability to put up a "wall" to defeat group 1 and 2 UAS systems will protect critical assets, personnel, and infrastructure that may otherwise be easily threatened by inexpensive and plentiful make shift aerial bombs. To address the issue of persistence we have developed a system that has the ability to keep a UAV airborne 24 hours a day for weeks or more. This is not a tethered system fixed to a point base and unmovable. Our solution is radical, moveable and has never existed before; essentially, it's a UAV powered by an electrical transmission infrastructure; portable or fixed. Power line wires and components on the poles for our system are arranged so that the power collector can ride on the wires and pass through. The device draws power from the power line and sends it to the drone through a tether enabling the drone to fly anywhere the power line is built by towing the device or by a self-propelled device all while powering its systems and sensors. A current technology problem of sensor placement is addressed by the present system where the desired coverage is within the range of the transmission infrastructure, tether, and sensors.

Reference numerals used throughout the detailed description and the drawings correspond to the following elements:
power line tethered unmanned aircraft system 100
unmanned aircraft 200
  propeller blades 210
  motor 220
  housing 230
  payloads 240
electrical transmission infrastructure 300
  desired path 302
  conductors 305
  line 307
  top wire 310
  bottom wire 320
  poles 330
  stand off hardware 350
    proximity base 351
    top extending arm 352
    bottom extending arm 353
    planar upward extending hand 354
    planar downward extending hand 355
    distal extending base 361
    top extending bent arm 362
    bottom extending straight arm 363
    planar upward extending hand 364
    planar downward extending hand 365
    upper fingers 366
    lower fingers 367
power collector 400
  first upper line trolley 410
  second lower line arm 420
  tension rollers 430
    top tension roller 431
    first side tension roller 432
    second side tension roller 433
  capturing cradle 435
  bottom tension roller 436
  side tension roller 437
  power collector 438 bottom tensioning spring 440
top tensioning spring 442
tether 500
power conductor line 510
collector end 520
vehicle end 530
electronics 600
extended sensor cone 602
power line parallel sensor area 604
drooping line supports 700
vertical support 702
first angled stabilizer 704
second angled stabilizer 706
opposing side line sets 708 opposing line pole support bracket 710
opposing line pole unsupported bracket 712

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A power line tethered unmanned aircraft system, comprising:
    transmission infrastructure including a vertically-planar-multiple-wire standoff supporting a plurality of wires;
    a power collector riding along the plurality of wires of the infrastructure;
    a tether electrically connected to the infrastructure through the power collector; and
    an unmanned aircraft carrying associated electronics powered by power received through the tether;
    wherein the vertically-planar-multiple-wire standoff includes stand off hardware including a base supporting a top horizontally extending arm and a bottom horizontally extending arm, the top extending arm supporting a planar upward extending hand and the bottom extending arm supporting a planar downward extending hand.

2. The apparatus of claim 1, the power collector comprising:
    a first upper line trolley connected to a second lower line arm.

3. The apparatus of claim 2, the power collector comprising:
    a first upper line trolley including at least one tension roller.

4. The apparatus of claim 2, the power collector comprising:
    a second lower line arm including a capturing cradle.

5. The apparatus of claim 1, the tether comprising:
    a power conductor line including a collector end connected to the power collector and a vehicle end connected to the unmanned aircraft.

6. The apparatus of claim 1, the unmanned aircraft comprising:
    propeller blades operated by a motor contained within a housing.

* * * * *